June 2, 1970    J. W. KING ET AL    3,515,984
APPARATUS AND METHOD FOR MEASURING DISTANCE
BETWEEN SPACED MAGNETIC MEMBERS
Filed Aug. 5, 1968    2 Sheets-Sheet 1
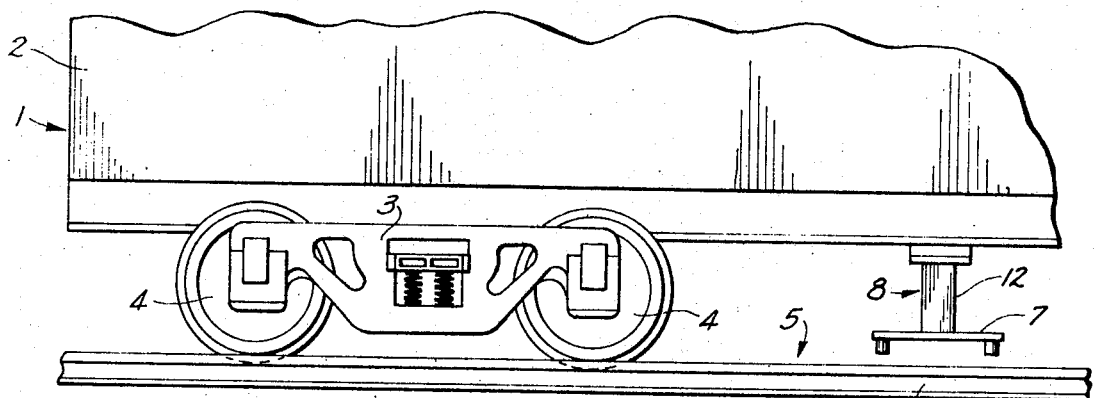
Fig. 1
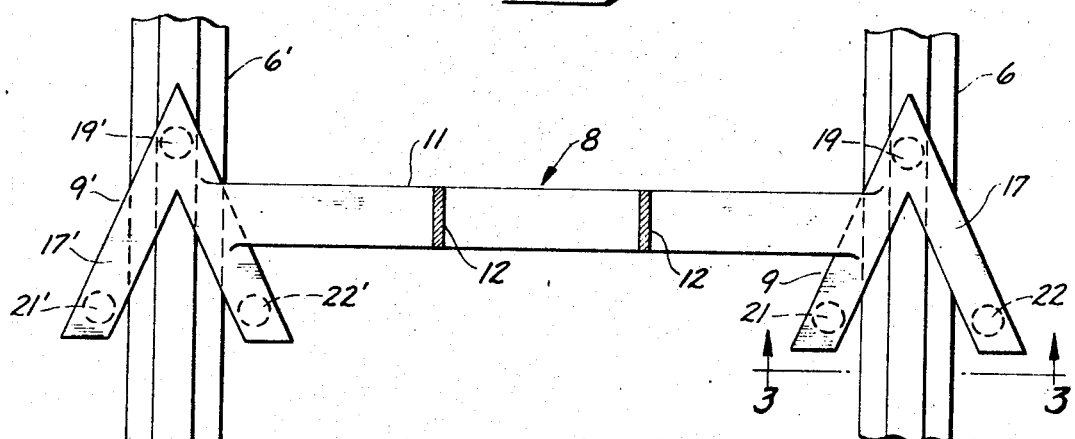
Fig. 2
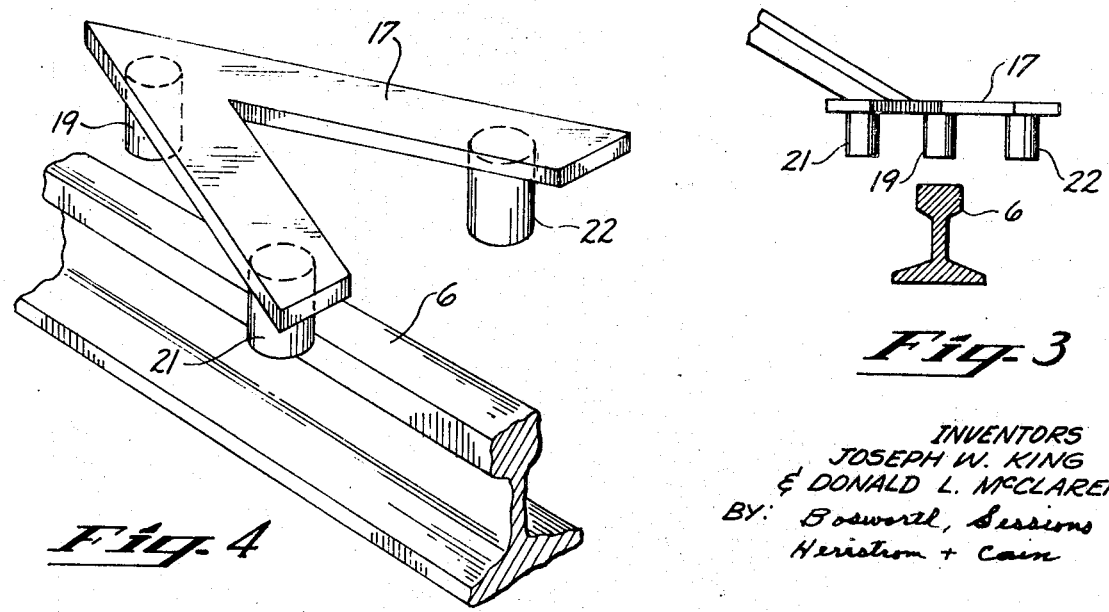
Fig. 3
Fig. 4
INVENTORS
JOSEPH W. KING
& DONALD L. McCLAREN
BY: Bosworth, Sessions
Heristrom + Cain
ATTORNEYS

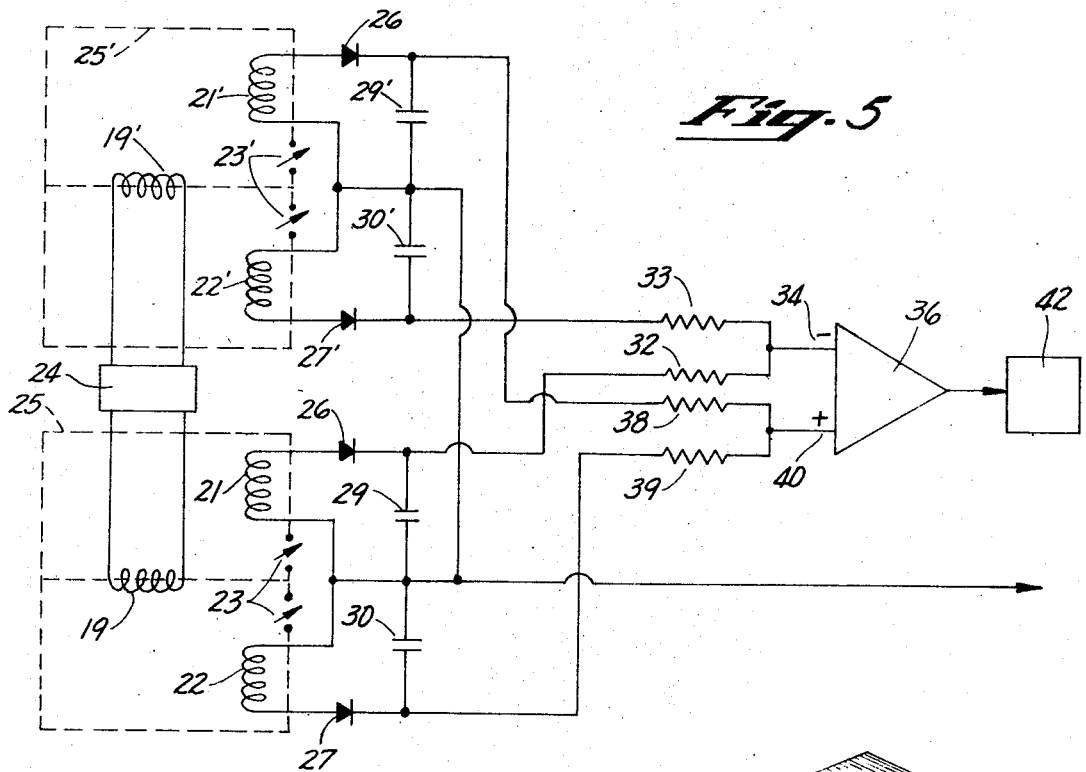
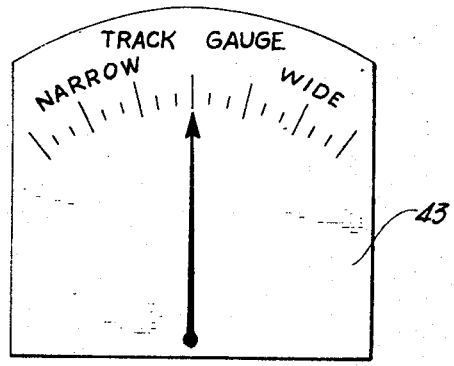
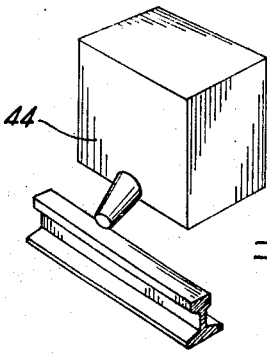
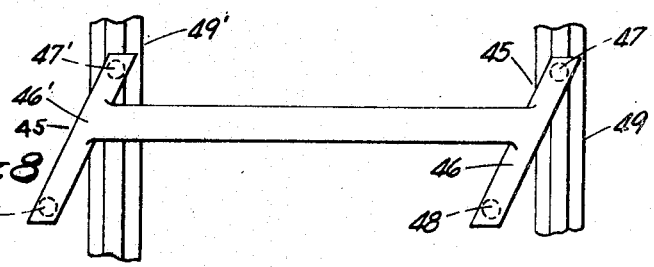
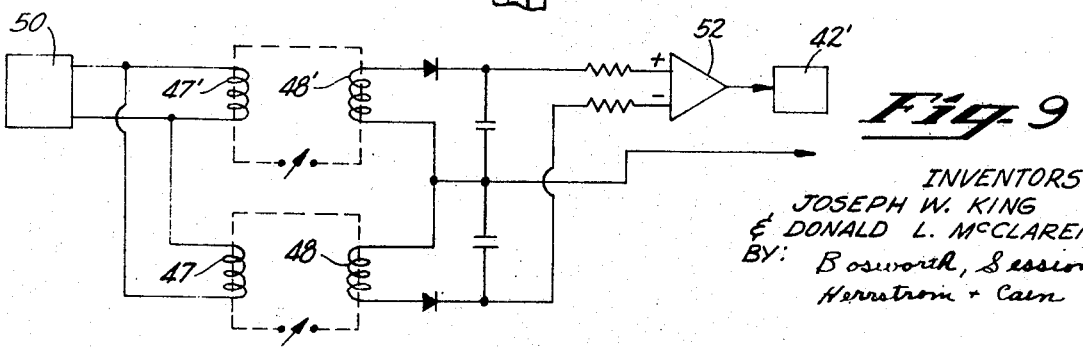

United States Patent Office

3,515,984
Patented June 2, 1970

3,515,984
APPARATUS AND METHOD FOR MEASURING DISTANCE BETWEEN SPACED MAGNETIC MEMBERS
Joseph W. King, Lakewood, and Donald L. McClaren, Cleveland, Ohio, assignors to Cleveland Technical Center, Inc., Cleveland, Ohio, a corporation of Delaware
Filed Aug. 5, 1968, Ser. No. 750,063
Int. Cl. G01r 33/00; B61k 9/00
U.S. Cl. 324—34                          12 Claims

ABSTRACT OF THE DISCLOSURE

Method and apparatus for continuously measuring and indicating distance between, or variations in distance between, generally parallel spaced members of substantial length such as railroad track rails. An A.C. energized primary coil and a secondary coil joined by a high permeability magnetic frame are positioned and moved adjacent each rail, constituting with it an electromagnetic circuit including an air gap. Variations in spacing between rails and coil cores change the air gaps causing corresponding variations of the voltage induced in the secondary coils. The voltage outputs of the two magnetic circuits are compared; a change in the air gap for one magnetic circuit unaccompanied by a corresponding opposed change in the other magnetic circuit results in a comparator output indicating a change in rail spacing.

BACKGROUND OF THE INVENTION

This invention relates to measurements of distance by electromagnetic means and more particularly to apparatus and method for continuously measuring variations in distance between long spaced magnetic members, such as the rails of a railroad track, by electromagnetic means.

Desirably, rail track gauge measurement apparatus is adapted to move along the track rails and give an indication of the rail or gauge spacing. Such apparatus is normally mounted on a wheeled vehicle that rolls along the rails.

Heretofore measurements of track gauge have usually been carried out by mechanical apparatus that includes means that contacts the rails. Such apparatus includes mechanical linkages or other mechanical means that transmit movements of the rail contacting means resulting from variations in track gauge to indicating means to indicate variations in track gauge.

Measurement of track gauge using such mechanical apparatus has the disadvantages inherent in moving contact between metal surfaces, such as friction and wear. Another disadvantage is the necessity of raising the rail-contacting means of the measuring apparatus to avoid damage to the apparatus when intersecting rails or the like are encountered. Any track gauge measuring apparatus that physically contacts the rails in measuring the track gauge of course suffers from the same disadvantages.

SUMMARY OF THE INVENTION

A general object of the invention is the provision of a method for detecting variations in distance between long spaced magnetic members such as the rails of a railroad track.

Another general object of the invention is to provide measuring apparatus that solves the above and other problems encountered in measuring track gauge with mechanical apparatus. A more particular object is the provision of electromagnetic measuring apparatus that may be mounted on a vehicle for continuous measurement of variations in standard track gauge, without contacting the track rails in measurement of the gauge. A still more particular object is the provision of electromagnetic measuring apparatus which includes means for distinguishing between lateral displacement of the track test vehicle relative to the track and a change in track gauge, to prevent a false indication.

A preferred form and embodiment of the apparatus of the invention comprises the combination of a pair of magnetic frame assemblies supported in spaced relation to the rails for movement along and generally parallel to the rails. Each assembly comprises a primary coil, at least one secondary coil, and a magnetic frame joining the primary coil to each of the secondary coils for establishing a magnetic path between primary and secondary coils. The magnetic circuit between primary and secondary coils is completed by the rail and the air gaps between the rails and coils.

A source of A.C. potential is coupled to each of the primary coils to produce a magnetic flux that links the corresponding secondary coils and induces in each a voltage proportional to the reluctance of the magnetic circuit between primary and secondary coils. In a given circuit reluctance will vary only with changes in the size of the air gaps.

As the assemblies are moved along the rails, changes will occur in the size of the air gaps causing changes in output from the secondary coils. The outputs are compared to determine if the changes in air gap size are due to variations in track gauge or to lateral shifting of the vehicle on which the assemblies are mounted.

The method of the invention comprises the steps of moving alternating magnetic flux producing means along corresponding sides of each rail to form therewith a magnetic circuit in which the flux is substantially proportional to the spacing between each flux producing means and the corresponding rail, detecting the amount of magnetic flux in each circuit, and comparing the flux in the circuits to determine the magnitude and direction of changes in the difference therebetween.

BRIEF DESCRIPTION OF THE DRAWINGS

FIG. 1 is a diagrammatic side elevation of a portion of a vehicle carrying magnetic circuit assembly means of the invention for measuring the gauge of the track rails.

FIG. 2 is a plan of two preferred magnetic circuit assemblies suspended above the two rails of a railroad track for magnetic cooperation therewith.

FIG. 3 is a vertical cross-section of the right hand rail and assembly of FIG. 2 along the line 3—3 of FIG. 2.

FIG. 4 is a perspective of a portion of one rail with a frame and coils suspended above the rail in working relation to the rail.

FIG. 5 is a schematic diagram of the electrical portions of the embodiment of the invention disclosed in FIGS. 1–4, with the magnetic circuits indicated in dotted lines and showing the electrical circuit from primary coil to comparator output.

FIG. 6 is a front view of a center scale voltmeter suitable for continuously indicating variations in track gauge.

FIG. 7 is a perspective of a device for marking the trackside to indicate out-of-limits track gauge.

FIG. 8 is a top view of a pair of railroad rails showing an alternate form of magnetic circuit assemblies in working relation with each rail.

FIG. 9 is a schematic diagram similar to FIG. 5 but relating to the embodiment of FIG. 8.

DESCRIPTION OF THE PREFERRED EMBODIMENTS

A preferred form and embodiment of the invention will be described in connection with a set of railroad tracks for continuously measuring and indicating the gauge or spacing between the tracks. The apparatus illustrated in FIG. 1 and 2 as embodying the invention comprises a vehicle 1 which travels along the tracks and includes vehicle body 2 carried by railway trucks 3, one of which is shown, supported by flanged wheels 4 that roll along the track 5. Track 5 is made up of rails 6 and 6' (FIG. 2) supported in a conventional manner.

Magnetic circuit assembly means, generally designated by numeral 7, is supported beneath vehicle body 2 by supporting means 8.

Magnetic circuit assembly means 7 comprises two magnetic circuit assemblies 9 mounted beneath vehicle body 2 by a transversely extending frame member 11 which is supported by vertical frame members 12. Assemblies 9 are supported for magnetic cooperation with the rails 6 and 6', as will be described more fully hereinafter.

FIGS. 2, 3 and 4 illustrate a preferred configuration and orientation with respect to the tracks of the magnetic circuit assembly means of this invention. A preferred form and embodiment of such means comprises two identical assemblies 9, 9' supported a fixed lateral distance apart a predetermined distance above the rails of a railroad track. Since the assemblies 9 and 9' are identical only one will be described. Corresponding parts of the other assembly will be referred to by primed reference numerals.

Each assembly comprises a flat frame 17 of high permeability magnetic material such as iron, a primary or transmitting coil 19 wound on a core of suitable material such as iron, and one or more secondary or pick-up coils 21, 22 having cores of like material. The coils are supported beneath the frame 17 as most clearly shown in FIGS. 3 and 4. The magnetic frame 17 is preferably V-shaped so that the primary coil 19 may be mounted at the apex of the V and the secondary coils at the extermities of the legs thereof.

Each assembly is so oriented with respect to the rail that primary coil 19 is suspended directly above the rail while the secondary coils 21 and 22 are spaced laterally on opposite sides of the rail, preferably an equal distance from the rail. The portion of the vehicle beneath which the assemblies are mounted is preferably supported from the wheels 4 so that, in operation, the vertical distance between an assembly and a rail will not vary materially from the vertical distance between the opposite assembly and rail. Preferably the body of the vehicle is unsprung for this reason. The vertical distance between the coils 19, 21, 22 and the top of the rail is preferably 3 to 4 inches. The lateral distance from the center of the rail to either of the coils 21, 22 is preferably 4 to 7 inches.

If the primary coil 19 is energized by an A.C. potential a magnetic field will be produced proportional to the ampere-turns in the coil. A series-parallel circuit exists for the resulting magnetic flux which comprises each leg of the frame 17, the iron cores of coils 21 and 22, the air gaps between secondary coils and rail, the iron rail, and the air gap between coil 19 and the rail. This alternating flux induces a voltage in each of coils 21 and 22 which is a function of the applied voltage, the ampere turns of coil 19, the reluctance of the magnetic circuit, and the number of turns in coils 21 and 22. If, in a given circuit, all of these parameters are held constant except the reluctance of the magnetic circuit then the voltage induced in coils 21 and 22 will be proportional to the reluctance. Since the reluctance of the magnetic circuit depends in turn upon the lengths of the air gaps the voltage induced in coils 21 and 22 respectively is a function of the air gap length in that particular branch of the circuit.

If the magnetic frame 17 moves laterally or vertically with respect to the rail a change will occur in the length of the air gap for each branch of the magnetic circuit. As the vehicle 1 moves along the rails variations will occur in lateral and vertical spacing between each rail and its associated secondary coils. Some of these variations will be due to changes in track gauge while others will be due to shifting of vehicle 1. Shifting variations may be caused by lateral shifting of the vehicle with respect to both rails or vertical shifting of one or both sides of the vehicle with respect to the rail caused by slight dips and the like in the ground over which the track is laid. Since the vehicle is unsprung, movements of one side of the vehicle with respect to the other caused and amplified by springs should be non-existent.

By comparing the outputs of coils 21 and 22 to each other and to the outputs of coils 21', 22' on the opposite rail assembly in a manner yet to be described, the variations in track gauge can be distinguished from changes in output caused by such factors as lateral or vertical shifting of the vehicle.

FIG. 5 is a schematic diagram of the electrical portions of this embodiment of the invention, with the magnetic circuit portions indicated in dotted outline. The variable air gaps in the magnetic circuits are identified by the reference numerals 23, 23'. In FIG. 5 primary coils 19, 19' are energized by a source of A.C. potential 24. The output of voltage source 24 produces magnetic flux in both rail magnetic circuits designated 25, 25'. The magnetic flux links the coils 21, 22 and 21', 22' inducing a voltage in each coil. The voltage outputs from the respective secondary coils are rectified by diodes 26, 27 and 26', 27' and filtered by capacitors 29, 30 and 29' 30'. The D.C. potentials so obtained are then summed and compared in the following manner.

The outputs from coils 21 and 22' which are between the two rails are summed in resistors 32 and 33 respectively and the result entered into input terminal 34 of a differential amplifier 36 used as a comparator. The outputs from coils 21' and 22 which are outside the rails are likewise summed in resistors 38, 39 and the result connected to input 40 of comparator 36. The output of comparator 36 will thus be proportional to the difference between the sum of the voltages from the coils 21 and 22' and the sum of the voltages from the coils 21' and 22. The output of comparator 36 is connected to a utilization device 42 which may be, for example, a center scale meter or a track marking device for marking the trackside.

Referring now to FIGS. 2, 3 and 4, consider the output of comparator 36 as assemblies 9 and 9' are moved along the track. So long as there are no changes in track gauge or lateral shifts of the vehicle or vertical movements of one side of the vehicle, the outputs from secondary coils 21, 22 and 21', 22' will be equal. Since the output of comparator 36 is effectively of the form (21'+22) minus (21+22') and the voltage induced in all secondary coils is equal the output of comparator 36 will be zero. If, however, the left hand rail in FIG. 2 should move outwardly or to the left the air gap between coil 21' and the rail will be reduced in length and the voltage induced in coil 21' increased. Correspondingly, the voltage induced in coil 22' will be reduced. Assuming that the right hand rail 6 remains in the same position relative to its frame assembly then input 40 to comparator 36 will become positive with respect to input 34 and the output of comparator 36 will become more positive by an amount proportional to the increase in track gauge. Similarly, if right hand rail 6 in FIG. 2 should move outwardly or to the right the voltage induced in coil 22 will increase while that induced in coil 21 would decrease by the same amount so that the output of comparator 36 would again become more positive indicating an increase in track gauge. Should the rails 6 and 6' move in opposite directions simultaneously, for example outwardly, then the output of comparator 36 would increase by an amount proportional to the change in track gauge contributed by both rails.

Movement of one or both rails 6 and 6' in FIG. 2 inwardly would similarly cause the output of comparator 36 to become more negative by an amount proportional to the decrease in track gauge contributed by one or both rails. Thus, the output of comparator 36 indicates continuously both the magnitude and direction of a change in track gauge.

A lateral shift of the vehicle 1, for example to the left, would cause an increase in the voltage induced in coils 22' and 22 and a decrease of the same amount in the voltage induced in coil 21' and 21. The output of comparator 36 would thus remain at zero indicating that no change in track gauge had occurred. Also, if the right side of vehicle 1 should move vertically closer to the right hand rail 6 because of a dip or the like the voltage induced in coils 21 and 22 will each be increased by the same amount. Again the increases will be balanced and the output of comparator 36 will remain at zero.

In each of the examples of track gauge variation given above utilization device 42 may use the output signal of comparator 36 for such things as continuously indicating the variations of track gauge or for initiating some action such as marking of the track to indicate an abnormal track gauge so that correction may subsequently be made.

FIG. 6 shows as one example of utilization device 42 a center scale voltmeter 43 which can be connected to the output of comparator 36 to provide a continuous indication of variations in track gauge.

FIG. 7 illustrates another example of utilization device 42. The track marking device 44 is actuated by comparator 36 whenever the output of the comparator reaches a level indicative of track gauge different from normal by a predetermined amount. The track marking device 44 causes marking of the trackside to indicate an out-of-limit track gauge at that point.

FIG. 8 shows an alternate magnetic circuit assembly in which only a single secondary coil is used. Each assembly 45 comprises a magnetic frame 46, which is essentially one leg of the V-shaped frame 17, a primary coil 47 identical to the primary coil 19, and a single secondary coil 48 identical to the secondary coils 21, 22. The assemblies are disposed on corresponding sides of their respective rails 49, 49'. The assemblies are shown on the left hand side of the respective rails but obviously may be disposed adjacent the right hand side of the rails if so desired. The operation is similar to the embodiment previously described but the arrangement of outputs from secondary coils 48, 48' is simpler since only a single series magnetic circuit exists in each assembly.

FIG. 9 is a schematic diagram of the electrical and magnetic portions of the embodiment of FIG. 8. In FIG. 9 a source of A.C. potential 50 energizes primary coils 47, 47'. The secondary coils 48, 48' link the magnetic flux produced by the primary coils as in the previous embodiment. Here, there is only one magnetic circuit and one secondary coil per assembly. The outputs of secondary coils 48 and 48' are rectified and smoothed as in the previous embodiment and entered into comparator 52 which connects to utilization device 42'.

In operation the output of comparator 52 will be of the form (48') minus (48). In FIG. 8 then, a shift to the right of the right hand rail 49 or a shift to the left of the left hand rail 49' will result respectively in a decrease in the voltage induced in coil 48 or an increase in the voltage induced in coil 48'. In either case the output of comparator 52 will become more positive indicating an increase in track gauge. In like manner shifts of either rail in the opposite directions from the previous example will cause a decrease in the output from comparator 52 indicating a decrease in track gauge. A lateral shift of the vehicle 1 in either direction will result in equal increases or equal decreases in the voltages induced in each of coils 48 and 48' so that the output of comparator 52 will remain at zero indicating no change in track gauge.

The embodiment of FIGS. 8 and 9 is simpler than the previously described embodiment and requires fewer components. The embodiment of FIGS. 2, 3, 4 and 5 however offers the advantage of providing air gaps on both sides of each rail and of an effective signal amplification by the coils in that each change in track gauge results in a signal increase to one input of comparator 36 and a corresponding signal decrease to the other input. The effective differential input to comparator 36 is thus doubled.

It is evident that the invention comprises novel apparatus for continuously measuring variations in the gauge of railroad tracks which eliminates the problems associated with prior art mechanical track gauge measuring apparatus. In addition, the invention automatically compensates for errors introduced by shifting of the vehicle beneath which the apparatus is preferably mounted for continuous measurement.

It will be obvious to those skilled in the art that the invention is useful for measuring distance or variations in distance between long spaced members of magnetic material generally and is not confined to measurement of variation in gauge of railroad tracks.

The invention encompasses not only novel apparatus for continuously measuring variations in distance between long spaced magnetic members but also a novel method for performing such measurements. The method of the invention comprises the steps of moving alternating magnetic flux producing means along corresponding sides of each member to form therewith a magnetic circuit in which the flux is substantially proportional to the spacing between each flux producing means and the corresponding member, detecting the amount of magnetic flux in each circuit, and comparing the flux in the circuits to determine the magnitude and direction of changes in the difference therebetween.

We claim:

1. Apparatus for measuring variations in distance between spaced elongated magnetic members comprising the combination of:

a pair of magnetic frame assemblies adapted to be supported in spaced relation to said members for longitudinal movement with respect thereto, each assembly comprising a primary coil, at least one secondary coil, and a magnetic frame joining said primary coil to each secondary coil for establishing a portion of a magnetic circuit therebetween, said magnetic circuit being completed through the adjacent one of spaced members;

means for supplying A.C. potential to each of said primary coils for producing in each magnetic flux linking each corresponding secondary coil and inducing therein a voltage substantially proportional to the reluctance of the magnetic circuit between said primary coil and said secondary coil to produce an output sginal therefrom; and means coupled to said secondary coils for comparing the output signals therefrom.

2. The apparatus of claim 1 wherein said magnetic frames are generally V-shaped, said primary coils are supported beneath said frames at the apex thereof, and said secondary coils are supported beneath said frames at the extremities of each leg thereof for positioning adjacent opposite sides of each of said members.

3. The apparatus of claim 1 wherein said means for comparing the output signals from said secondary coils comprises a rectifier coupled to each secondary coil for rectifying the output thereof, a first summing circuit for summing the rectified outputs from said secondary coils positioned outside said members, a second summing circuit for summing the rectified outputs from said secondary coils positioned between said members, and a differential amplifier having one input coupled to the output of said first summing circuit and the remaining input coupled to the output of said second summing circuit.

4. Apparatus for measuring variations in distance between first and second rails of a railroad track comprising the combination of:

a first primary coil supported in spaced relation to said first rail for movement with respect thereto;

a second primary coil supported in spaced relation to said second rail for movement with respect thereto, said coils being supported a laterally fixed distance apart;

a first secondary coil supported in spaced relation to one side of said first rail;

a second secondary coil supported in spaced relation to the corresponding side of said second rail;

a first frame of magnetic material extending between said first primary coil and said first secondary coil for establishing a portion of a first magnetic circuit therebetween, said first magnetic circuit being completed through said first rail;

a second frame of magnetic material extending between said second primary coil and said second secondary coil for establishing a portion of a second magnetic circuit therebetween, said second magnetic circuit being completed through said second rail;

means for applying A.C. potential to each of said primary coils to thereby produce an output signal from each of said secondary coils;

means for converting the output signal from each secondary coil to a D.C. signal; and means for comparing the D.C. signals so obtained.

5. The apparatus of claim 4 wherein said first and secondary primary coils are supported above said first and second rails respectively and said first and second secondary coils are supported laterally of corresponding sides of said first and second rails respectively.

6. Apparatus for measuring variations in distance between first and second rails of a railroad track comprising the combination of:

a first primary coil supported in spaced relation to said first rail for movement with respect thereto;

a second primary coil supported in spaced relation to said second rail for movement with respect thereto, said coils being supported a laterally fixed distance apart;

a first pair of secondary coils supported in spaced relation to opposite sides of said first rail;

a second pair of secondary coils supported in spaced relation to opposite sides of said second rail;

a first frame of magnetic material extending between said first primary coil and each coil of said first pair of secondary coils for establishing a portion of a first magnetic circuit between said first primary coil and each of said first pair of secondary coils, said first magnetic circuit being completed through said first rail;

a second frame of magnetic material extending between said second primary coil and each coil of said second pair of secondary coils for establishing a portion of a second magnetic circuit between said second primary coil and each of said second pair of secondary coils, said second magnetic circuit being completed through said second rail;

means for applying A.C. potential to each of said primary coils to thereby produce an output signal from each of said secondary coils;

means for converting the output signal from each secondary coil to a D.C. signal; and means for comparing said D.C. signals to determine the variations in distance between said first and second rails.

7. The apparatus of claim 6 wherein said first and second primary coils are supported above said first and second rails respectively, said first pair of secondary coils is supported laterally of the opposite sides of said first rail, and said second pair of secondary coils is supported laterally of the opposite sides of said second rail.

8. The apparatus of claim 6 wherein said means for comparing said D.C. signals comprises a first summing circuit for summing the output signals from said secondary coils positioned outside said rails, a second circuit for summing the output signals from said secondary coils positioned between said rails, and a differential amplifier having one input coupled to the output of said first summing circuit and the remaining input coupled to the output of said second summing circuit.

9. Apparatus for continuously measuring variations in the gauge of railroad tracks comprising:

a pair of generally V-shaped frames of high permeability magnetic material, means for supporting said frames a laterally fixed distance apart above the rails of said track for movement with respect thereto, each of said frames being supported above a rail so that the legs of the V extend on opposite sides of said rail an equal distance therefrom when said rails are a standard distance apart to constitute a magnetic circuit therewith, a primary coil supported beneath each frame at the apex thereof, a secondary coil supported beneath each leg at the extremity thereof, means for supplying A.C. potential to each of said primary coils, whereby a voltage is induced in each secondary coil proportional to the length of the air gaps in the respective magnetic circuits, a rectifier coupled to each of said secondary coils, a summing circuit for summing the output of the rectifiers coupled to the coils lying between said rails, a summing circuit for summing the output of the rectifiers coupled to the coils lying outside said rails, and differential amplifier means coupled to said summing circuits for determining and amplifying the difference between the outputs thereof.

10. The method of measuring variations in distance between long spaced magnetic members which comprises the steps of:

moving alternating magnetic flux producing means along corresponding sides of each member in spaced relation thereto to form therewith a magnetic circuit in which the flux is proportional to the spacing between each flux producing means and the corresponding member;

detecting the amount of magnetic flux in each circuit; and comparing the flux in the circuits to determine the magnitude and direction of changes in the difference therebetween.

11. The method of continuously measuring variations in distance between the rails of a railroad track comprising the steps of:

supporting alternating magnetic flux producing means adjacent corresponding sides of each rail at equal distances therefrom when said rails are a standard distance apart to form with said rail a magnetic circuit in which the flux is proportional to the spacing between each flux producing means and the corresponding rail;

moving the magnetic flux producing means with respect to the rails to detect changes in spacing thereof;

converting the magnetic flux in each circuit to a voltage proportional to the flux; and comparing the voltages from the circuits to determine the changes in magnitude and direction in the difference therebetween.

12. The method of continuously measuring variations in distance between the rails of a railroad track comprising the steps of:

supporting relatively fixed alternating magnetic flux producing means adjacent both sides of each rail at equal distances therefrom when said rails are a standard distance apart to form with each of said rails a pair of magnetic circuits in which the flux is proportional to the spacing between each flux producing means and the corresponding rail;

moving the magnetic flux producing means along the rails to detect changes in the spacing thereof;

converting the magnetic flux in each circuit to a voltage proportional to the flux;

summing the voltages from the circuits outside the rails;

summing the voltages from the circuits between the rails; and comparing the voltage sums obtained to determine the changes in magnitude and direction in the difference therebetween.

References Cited

UNITED STATES PATENTS 3,100,889  8/1963  Cannon _____ 340—199 X

FOREIGN PATENTS 1,197,494  7/1965  Germany.

ALFRED E. SMITH, Primary Examiner

U.S. Cl. X.R.

33—144; 340—265, 199